(12) United States Patent  (10) Patent No.: US 9,184,668 B2
Telefus  (45) Date of Patent: Nov. 10, 2015

(54) POWER MANAGEMENT INTEGRATED CIRCUIT PARTITIONING WITH DEDICATED PRIMARY SIDE CONTROL WINDING

(71) Applicant: Flextronics AP, LLC, Broomfield, CO (US)

(72) Inventor: Mark Telefus, Orinda, CA (US)

(73) Assignee: Flextronics AP, LLC, Broomfield, CO (US)

( * ) Notice: Subject to any disclaimer, the term of this patent is extended or adjusted under 35 U.S.C. 154(b) by 202 days.

(21) Appl. No.: 14/024,514

(22) Filed: Sep. 11, 2013

(65) Prior Publication Data

US 2014/0268911 A1    Sep. 18, 2014

Related U.S. Application Data

(60) Provisional application No. 61/799,124, filed on Mar. 15, 2013, provisional application No. 61/793,099, filed on Mar. 15, 2013.

(51) Int. Cl.
  *H02M 3/335*    (2006.01)
(52) U.S. Cl.
  CPC ...... *H02M 3/33523* (2013.01); *H02M 3/33592* (2013.01); *Y02B 70/1475* (2013.01)
(58) Field of Classification Search
  CPC ............ H02M 3/335; H02M 3/33523; H02M 3/33553; H02M 3/33538; H02M 3/33546; Y02B 70/1433
  USPC .......... 363/21.06, 21.07, 21.08, 21.14, 21.15, 363/21.16, 127, 21.04, 97
  See application file for complete search history.

(56) References Cited

U.S. PATENT DOCUMENTS

| 4,273,406 A | 6/1981 | Okagami |
| 4,370,703 A | 1/1983 | Risberg |
| 4,563,731 A | 1/1986 | Sato et al. |

(Continued)

FOREIGN PATENT DOCUMENTS

| JP | 4217869 A | 8/1992 |
| JP | 10243640 A | 9/1998 |

(Continued)

OTHER PUBLICATIONS

EE Times.com—"Team Claims Midrange Wireless Energy Transfer", by R. Colin Johnson, 4 pages, Nov. 6, 2007.

(Continued)

*Primary Examiner* — Gary L Laxton
(74) *Attorney, Agent, or Firm* — Haverstock & Owens LLP

(57) ABSTRACT

A switched mode power converter having a feedback mechanism by which a coded train of pulses with well defined integrity is generated on a secondary side of the power converter and transmitted to a dedicated control signal winding on the primary side for decoding and application to regulate the power converter output. The control signal winding enables separation of control signal transmission and power transmission resulting in improved processing of the control signal by a primary side controller. The pulse train is modulated by a secondary side controller, transmitted across a transformer and received by the control signal winding, and supplied to the primary side controller. Coded information is included in the coded pulse train by modulating pulses of the pulse train.

27 Claims, 8 Drawing Sheets

(56) References Cited

U.S. PATENT DOCUMENTS

| | | | |
|---|---|---|---|
| 4,645,278 A | 2/1987 | Yevak et al. |
| 4,712,160 A | 12/1987 | Sato et al. |
| 4,788,626 A | 11/1988 | Neidig et al. |
| 4,806,110 A | 2/1989 | Lindeman |
| 4,841,220 A | 6/1989 | Tabisz et al. |
| 4,857,822 A | 8/1989 | Tabisz et al. |
| 4,866,367 A | 9/1989 | Ridley et al. |
| 4,890,217 A | 12/1989 | Conway |
| 4,893,227 A | 1/1990 | Gallios et al. |
| 4,899,256 A | 2/1990 | Sway-Tin |
| 4,901,069 A | 2/1990 | Veneruso |
| 5,065,302 A | 11/1991 | Kanazawa |
| 5,090,919 A | 2/1992 | Tsuji |
| 5,101,322 A | 3/1992 | Ghaem et al. |
| 5,132,890 A | 7/1992 | Blandino |
| 5,235,491 A | 8/1993 | Weiss |
| 5,325,283 A | 6/1994 | Farrington |
| 5,365,403 A | 11/1994 | Vinciarelli et al. |
| 5,373,432 A | 12/1994 | Vollin |
| 5,442,540 A | 8/1995 | Hua |
| 5,673,185 A | 9/1997 | Albach et al. |
| 5,712,772 A | 1/1998 | Telefus et al. |
| 5,768,118 A | 6/1998 | Faulk et al. |
| 5,786,992 A | 7/1998 | Vinciarelli et al. |
| 5,790,395 A | 8/1998 | Hagen |
| 5,811,895 A | 9/1998 | Suzuki et al. |
| 5,838,554 A | 11/1998 | Lanni |
| 5,841,641 A * | 11/1998 | Faulk .................. 363/21.14 |
| 5,859,771 A | 1/1999 | Kniegl |
| 5,905,369 A | 5/1999 | Ishii et al. |
| 5,923,543 A | 7/1999 | Choi |
| 5,949,672 A | 9/1999 | Bernet |
| 5,978,238 A | 11/1999 | Liu |
| 6,009,008 A | 12/1999 | Pelly |
| 6,091,611 A | 7/2000 | Lanni |
| 6,183,302 B1 | 2/2001 | Daikuhara et al. |
| 6,191,957 B1 | 2/2001 | Peterson |
| 6,272,015 B1 | 8/2001 | Mangtani |
| 6,275,397 B1 | 8/2001 | McClain |
| 6,301,135 B1 * | 10/2001 | Mammano et al. ............. 363/95 |
| 6,307,761 B1 | 10/2001 | Nakagawa |
| 6,323,627 B1 | 11/2001 | Schmiederer et al. |
| 6,385,059 B1 | 5/2002 | Telefus et al. |
| 6,388,897 B1 | 5/2002 | Ying et al. |
| 6,390,854 B2 | 5/2002 | Yamamoto et al. |
| 6,396,716 B1 | 5/2002 | Liu et al. |
| 6,452,816 B2 | 9/2002 | Kuranki |
| 6,459,175 B1 | 10/2002 | Potega |
| 6,487,098 B2 | 11/2002 | Malik et al. |
| 6,549,409 B1 | 4/2003 | Saxelby et al. |
| 6,578,253 B1 | 6/2003 | Herbert |
| 6,721,192 B1 | 4/2004 | Yang et al. |
| 6,775,162 B2 | 8/2004 | Mihai et al. |
| 6,894,461 B1 | 5/2005 | Hack et al. |
| 6,919,715 B2 | 7/2005 | Muratov et al. |
| 6,989,997 B2 | 1/2006 | Xu |
| 7,035,126 B1 | 4/2006 | Lanni |
| 7,038,406 B2 | 5/2006 | Wilson |
| 7,102,251 B2 | 9/2006 | West |
| 7,139,180 B1 | 11/2006 | Herbert |
| 7,202,640 B2 | 4/2007 | Morita |
| 7,205,752 B2 | 4/2007 | Jansen |
| 7,208,833 B2 | 4/2007 | Nobori et al. |
| 7,212,420 B2 | 5/2007 | Liao |
| 7,215,560 B2 | 5/2007 | Soldano et al. |
| 7,239,532 B1 | 7/2007 | Hsu et al. |
| 7,274,175 B2 | 9/2007 | Manolescu |
| 7,315,460 B2 | 1/2008 | Kyono |
| 7,386,286 B2 | 6/2008 | Petrovic et al. |
| 7,450,388 B2 | 11/2008 | Beihoff et al. |
| 7,554,310 B2 | 6/2009 | Chapuis et al. |
| 7,564,706 B1 | 7/2009 | Herbert |
| 7,579,919 B1 | 8/2009 | Cao |
| 7,596,007 B2 | 9/2009 | Phadke |
| 7,605,570 B2 | 10/2009 | Liu et al. |
| 7,630,221 B2 | 12/2009 | Sui et al. |
| 7,659,678 B2 | 2/2010 | Maiocchi |
| 7,701,305 B2 | 4/2010 | Lin et al. |
| 7,730,676 B2 | 6/2010 | Hon |
| 7,755,914 B2 | 7/2010 | Telefus et al. |
| 7,760,519 B2 | 7/2010 | Telefus et al. |
| 7,830,684 B2 | 11/2010 | Taylor |
| 7,889,521 B2 * | 2/2011 | Hsu ......................... 363/21.14 |
| 7,924,578 B2 | 4/2011 | Jansen et al. |
| 7,956,592 B2 | 6/2011 | Morroni et al. |
| 7,978,489 B1 | 7/2011 | Telefus et al. |
| 7,990,122 B2 | 8/2011 | Sase et al. |
| 8,040,117 B2 | 10/2011 | Telefus |
| 8,049,481 B2 | 11/2011 | Li et al. |
| 8,059,434 B2 | 11/2011 | Huang et al. |
| 8,094,473 B2 | 1/2012 | Moon et al. |
| 8,102,678 B2 | 1/2012 | Jungreis |
| 8,125,181 B2 | 2/2012 | Gregg et al. |
| 8,126,181 B2 | 2/2012 | Yamamoto et al. |
| 8,134,848 B2 | 3/2012 | Whittam et al. |
| 8,155,368 B2 | 4/2012 | Cheung et al. |
| 8,194,417 B2 | 6/2012 | Chang |
| 8,199,541 B2 | 6/2012 | Yang |
| 8,207,717 B2 | 6/2012 | Uruno et al. |
| 8,243,472 B2 | 8/2012 | Chang et al. |
| 8,279,646 B1 | 10/2012 | Hamstra |
| 8,289,741 B2 | 10/2012 | Jungreis |
| 8,344,689 B2 | 1/2013 | Boguslavskij |
| 8,363,434 B2 | 1/2013 | Lin |
| 8,369,111 B2 | 2/2013 | Balakrishnan et al. |
| 8,374,003 B2 * | 2/2013 | Matsumoto ................ 363/21.01 |
| 8,385,032 B1 | 2/2013 | Mao et al. |
| 8,400,801 B2 | 3/2013 | Shinoda |
| 8,441,810 B2 | 5/2013 | Telefus et al. |
| 8,488,340 B2 | 7/2013 | Zhang et al. |
| 8,520,410 B2 | 8/2013 | Telefus et al. |
| 8,749,210 B1 | 6/2014 | Nakao et al. |
| 8,767,357 B2 | 7/2014 | Xie et al. |
| 2002/0008963 A1 | 1/2002 | Dibene et al. |
| 2002/0011823 A1 | 1/2002 | Lee |
| 2002/0036200 A1 | 3/2002 | Ulrich et al. |
| 2003/0035303 A1 | 2/2003 | Balakrishnan et al. |
| 2003/0112645 A1 | 6/2003 | Schlecht |
| 2004/0062061 A1 | 4/2004 | Bourdillon et al. |
| 2004/0183510 A1 | 9/2004 | Sutardja et al. |
| 2004/0252529 A1 | 12/2004 | Huber et al. |
| 2005/0024016 A1 | 2/2005 | Breen et al. |
| 2005/0036338 A1 | 2/2005 | Porter et al. |
| 2005/0117376 A1 | 6/2005 | Wilson |
| 2005/0138437 A1 | 6/2005 | Allen et al. |
| 2005/0194942 A1 | 9/2005 | Hack et al. |
| 2005/0225257 A1 | 10/2005 | Green |
| 2005/0254268 A1 | 11/2005 | Reinhard et al. |
| 2005/0270001 A1 | 12/2005 | Jitaru |
| 2006/0002155 A1 | 1/2006 | Shteynberg et al. |
| 2006/0022637 A1 | 2/2006 | Wang et al. |
| 2006/0152947 A1 | 7/2006 | Baker et al. |
| 2006/0213890 A1 | 9/2006 | Kooken et al. |
| 2006/0232220 A1 | 10/2006 | Melis |
| 2007/0040516 A1 | 2/2007 | Chen |
| 2007/0087784 A1 | 4/2007 | Yamamoto et al. |
| 2007/0120542 A1 | 5/2007 | LeMay |
| 2007/0121981 A1 | 5/2007 | Koh et al. |
| 2007/0138971 A1 | 6/2007 | Chen |
| 2007/0247091 A1 | 10/2007 | Maiocchi |
| 2007/0263415 A1 | 11/2007 | Jansen et al. |
| 2008/0018265 A1 | 1/2008 | Lee et al. |
| 2008/0043496 A1 | 2/2008 | Yang |
| 2008/0191667 A1 | 8/2008 | Kernahan et al. |
| 2009/0034299 A1 | 2/2009 | Lev |
| 2009/0045889 A1 | 2/2009 | Goergen et al. |
| 2009/0196073 A1 | 8/2009 | Nakahori |
| 2009/0230929 A1 | 9/2009 | Sui et al. |
| 2009/0290384 A1 | 11/2009 | Jungreis |
| 2009/0300400 A1 | 12/2009 | DuBose |
| 2010/0039833 A1 | 2/2010 | Coulson et al. |
| 2010/0110732 A1 | 5/2010 | Moyer |
| 2010/0289466 A1 | 11/2010 | Telefus et al. |
| 2010/0317216 A1 | 12/2010 | Pocrass |

(56) References Cited

U.S. PATENT DOCUMENTS

| | | |
|---|---|---|
| 2010/0322441 A1 | 12/2010 | Weiss et al. |
| 2011/0132899 A1 | 6/2011 | Shimomugi et al. |
| 2011/0261590 A1 | 10/2011 | Liu |
| 2012/0112657 A1 | 5/2012 | Van Der Veen et al. |
| 2012/0268084 A1 | 10/2012 | Wang et al. |
| 2013/0049709 A1 | 2/2013 | Fu et al. |
| 2013/0148385 A1 | 6/2013 | Zhang |
| 2014/0091839 A1 | 4/2014 | Peters et al. |
| 2014/0153299 A1 | 6/2014 | Jeong et al. |
| 2015/0002108 A1 | 1/2015 | Kim |

FOREIGN PATENT DOCUMENTS

| | | |
|---|---|---|
| JP | 2000083374 A | 3/2000 |
| JP | 20000253648 A | 9/2000 |
| JP | 2004208357 A | 7/2004 |

OTHER PUBLICATIONS

EE Times. com—"Wireless Beacon Could Recharge Consumer Devices", by R. Colin Johnson, 3 pages, Nov. 6, 2007.

Novel Zero-Voltage and Zero-Current Switching (ZVZCS) Full Bridge PWM converter Using Coupled Output Inductor, Sep. 2002 IEEE, pp. 641-648.

"New Architectures for Radio-Frequency dc/dc Power Conversion", Juan Rivas et al., Laboratory for Electromagnetic and Electronic Systems, Jan. 2004, Massachusetts Institute of Technology, Room 10-171 Cambridge, MA 02139, pp. 4074-4084.

"Randomized Modulation in Power Electronic Converters". Aleksander M. Stankovic, member IEEE, and Hanoch Lev-Ari, vol. 90, No. 5, May 2002, pp. 782-799.

"Analysis and Special Characteristics of a Spread-Spectrum Technique for Conducted EMI Suppression", K.K. tse, et al. Member IEEE, IEEE Transactions on Power Electronics, vol. 15., No. 2, Mar. 2000, pp. 399-410.

\* cited by examiner

POWER MANAGEMENT INTEGRATED CIRCUIT PARTITIONING WITH DEDICATED PRIMARY SIDE CONTROL WINDING

RELATED APPLICATIONS

This patent application claims priority under 35 U.S.C. 119 (e) of the co-pending U.S. Provisional Application Ser. No. 61/799,124, filed Mar. 15, 2013, and entitled "New Power Management Integrated Circuit Partitioning With Dedicated Primary Side Control Winding" and the co-pending U.S. Provisional Application Ser. No. 61/793,099, filed Mar. 15, 2013, and entitled "New Power Management Integrated Circuit Partitioning". This application incorporates U.S. Provisional Application Ser. No. 61/799,124 and U.S. Provisional Application Ser. No. 61/793,099 in their entireties by reference.

FIELD OF THE INVENTION

The present invention is generally directed to the field of power converters. More specifically, the present invention is directed to controlling a power converter.

BACKGROUND OF THE INVENTION

In many applications a power converter is required to provide a voltage within a predetermined range formed from a voltage source having a different voltage level. Some circuits are subject to uncertain and undesirable functioning and even irreparable damage if supplied power falls outside a certain range. More specifically, in some applications, a precise amount of power is required at known times. This is referred to as regulated power supply.

In order to control a power converter to deliver a precise amount of power as conditions require, some form of control of the power converter is required. This control can occur on the primary side of an isolation transformer or the secondary side. A closed loop feedback control system is a system that monitors some element in the circuit, such as the circuit output voltage, and its tendency to change, and regulates that element at a substantially constant value. Control on the secondary side of a power converter can use a monitored output voltage as feedback control, but requires the use of some communication from the secondary to the primary side of the isolation transformer to control the primary side switching element. Control on the primary side can readily control the primary side switching element, but requires some feedback mechanism from the secondary side to the primary side to convey the status of the monitored element. In some applications, an optical coupler circuit, or opto coupler, is used to transmit feedback signals while maintaining electrical isolation between the primary and secondary sides.

FIG. 1 illustrates a conventional regulated switch mode power converter including an optical coupler circuit. The power converter 2 is configured as a traditional flyback type converter. The power converter 2 includes an isolation transformer 4 having a primary winding P1 and a secondary winding S1. The primary winding P1 is electrically coupled to an input voltage Vin and a driving circuit including a transistor 8, a resistor 12, and a controller 10. A capacitor 28 is coupled across the input Vin and coupled with the primary winding P1. Input voltage to the circuit may be unregulated DC voltage derived from an AC supply after rectification and filtering. The transistor 8 is a fast-switching device, such as a MOSFET, the switching of which is controlled by the fast dynamic controller 10 to maintain a desired output voltage Vout. The controller 10 is coupled to the gate of the transistor 8. As is well known, the DC/DC conversion from the primary winding P1 to the secondary winding S1 is determined by the duty cycle of a pulse width modulation (PWM) switching signal provided to the transistor 8. The secondary winding voltage is rectified and filtered using the diode 6 and the capacitor 22. A sensing circuit and a load 14 are coupled in parallel to the secondary winding S1 via the diode 6. The sensing circuit includes a resistor 16, a resistor 18, and a secondary controller 20. The secondary controller 20 senses the output voltage Vout across the load.

In this configuration, the power converter is controlled by driving circuitry on the primary side, and the load coupled to the output is isolated from the control. As such, a monitored output voltage used for voltage regulation is required as feedback from the secondary side to the control on the primary side. The power converter 2 has a voltage regulating circuit that includes the secondary controller 20 and an optical coupler circuit. The optical coupler circuit includes two galvanically isolated components, an optical diode 24 coupled to the secondary controller 20 and an optical transistor 26 coupled to the controller 10. The optical diode 24 provides optical communication with the optical transistor 26 across the isolation barrier formed by the transformer 4. The optical coupler circuit in cooperation with the secondary controller 20 provides feedback to the controller 10. The controller 10 accordingly adjusts the duty cycle of the transistor 8 to compensate for any variances in an output voltage Vout.

However, the use of an optical coupler circuit in and of itself presents issues. Firstly, the optical coupler circuit adds extra cost. In some applications, the optical coupler circuit can add more cost to the power converter than the isolation transformer. The optical coupler circuit also adds to manufacturing and testing costs. Furthermore, the performance of the optical coupler circuit degrades over time and therefore introduces another potential point of failure in the overall power converter. Also, characteristics of the optical coupler circuit must be accounted for in the overall circuit design. For example, the optical diode component is non-linear and as such a correlation between the optical diode and the optical transistor must be established. The optical coupler circuit also has delays related to the operation of the optical diode and the optical transistor, and the operation of the optical diode requires a well defined DC level. As a result, it is generally desirable to avoid the use of an optical coupler circuit.

A next generation of feedback control does not use optical control circuitry. Instead, the transformer is used to convey real-time feedback signaling from the secondary side to the primary side. In such an application, the transformer includes an auxiliary winding on the primary side that is magnetically coupled to the secondary winding. FIG. 2 illustrates a conventional regulated power converter including a magnetically coupled feedback circuit. The power converter 32 is configured as a traditional flyback type converter. The power converter 32 includes an isolation transformer 34 having a primary winding P1 and a secondary winding S1. The primary winding P1 is electrically coupled to an input voltage Vin and a driving circuit including a transistor 44, a resistor 46, and a controller 42. A capacitor 58 is coupled across the input Vin and coupled with the primary winding P1. Input voltage to the circuit may be unregulated DC voltage derived from an AC supply after rectification and filtering. Similar to the power converter in FIG. 1, the transistor 44 is a fast-switching device controlled by the fast dynamic controller 42 to maintain a desired output voltage Vout. The secondary winding voltage is rectified and filtered using the diode 36 and the capacitor 38, with the output voltage Vout delivered to the load 40.

The power converter 32 has a feedback loop that includes a magnetically coupled feedback circuit coupled to the secondary winding S1 of the transformer 34 and the controller 42. The magnetically coupled feedback circuit includes a diode 48, a capacitor 50, resistors 52 and 54 and an auxiliary winding 56. The auxiliary winding 56 is coupled in parallel to the series of resistors 52 and 54.

The voltage VA is proportional to the voltage across the auxiliary winding 56. The voltage VA is provided as a feedback voltage VFB to the controller 42. The current through the transistor 44 is also provided as feedback current IFB to the controller 42. The controller 42 includes a real-time waveform analyzer that analyzes input feedback signals, such as the feedback voltage VFB and the feedback current IFB.

The auxiliary winding 56 is also magnetically coupled to the secondary winding S1. When the current through the diode 36 is zero, the voltage across the secondary winding S1 is equal to the voltage across the auxiliary winding 56. This relationship provides means for communicating the output voltage Vout as feedback to the primary side of the circuit. The voltage across the auxiliary winding 56 is measured when it is determined that the current through the diode 36 is zero, which provides a measure of the voltage across the secondary winding S1 and therefore the output voltage Vout.

The feedback voltage VFB when the diode 36 current is zero is determined and is referred to as the "voltage sense", and the feedback current IFB when the diode 36 current is zero is determined and is referred to as the "current sense". The voltage sense and the current sense are input to the real-time waveform analyzer within the controller 42. FIG. 3 illustrates a functional block diagram of a conventional real-time waveform analyzer 60. Error amplifiers 62 and 64 are acceptors of the regulating means, which in this configuration are the sensed voltage and the sensed current. The error amplifier compares the input sensed voltage to a reference voltage and outputs a first difference value. The first difference value is amplified by the gain of the error amplifier 62. The error amplifier 64 compares the amplified first difference value to the sensed current and outputs a second difference value that is either High or Low. A pulse width modulation (PWM) block 66 is configured as a Flip-Flop digital device. The output of the PWM block 66 is set according to the switching frequency of the clock 68 and is Reset by the High or Low value input from the error amplifier 64. The variable signal applied to the Reset pin generates an output signal that is a pulse train modulated by the pulse width. A multiple input OR gate 70 inputs the clock signal, the pulse train signal, a shutdown signal, and a OVP/UVP/OTP signal, where OVP stands for "over voltage protection", UVP stands for "under-voltage protection" and OTP stands for "over temperature protection". The waveform analyzer is configured to output a high voltage value when one of the inputs to the OR gate is high or to output a low voltage value when all of the inputs to the OR gate are low. The high voltage value output from the waveform analyzer corresponds to turning on the transistor 44 in FIG. 2. The low voltage value corresponds to turning off the transistor 44. The OR gate also enables a high voltage signal output from the PWM block 66 to propagate to the output by monitoring abnormal conditions such as under voltage, over voltage, over temperature, etc. In this manner, the pulse width of each pulse can be modified which adjusts the output voltage into regulation.

In general, control intricacies of the waveform analyzer are aligned with control argument sampling to achieve overall system functional performance. Sampling argument is in the form of current, voltage and impedance. System functional performance is in the form of pulse width modulation (PWM), pulse frequency modulation (PFM) and pulse amplitude modulation (PAM). The waveform analyzer of FIG. 3 is limited to signal processing in DC or real-time switching waveforms. In either case, the feedback signal received by the waveform analyzer requires some status integrity, such as no noise on the DC level, no disturbance on the switching waveform and to some degree represent a combination of analog and digital representations. The voltage across the auxiliary winding typically forms a pulse train with frequency corresponding to the switching frequency of the driving transistor. The voltage across the auxiliary winding when the secondary winding current is zero, which corresponds to the diode 36 current equaling zero, corresponds to the falling edge of the pulse. As such, measuring an accurate voltage value requires that the pulse is well defined with sufficient pulse integrity particularly at the falling edge. Further, the voltage value immediately following the rising edge includes ringing due to the leakage impedance of the transformer. As such, pulse integrity also requires sufficient time for the voltage value to stabilize following the rising edge. Higher switching frequencies minimize the pulse width and therefore provide less time for voltage stabilization. For at least these reasons, providing a pulse with sufficient pulse integrity is often difficult to achieve.

Another type of feedback mechanism uses a second transformer as a gate drive transformer controlled by a pulse width modulator on the secondary side of the circuit. FIG. 8 illustrates a conventional regulated power converter including a second transformer used as a gate drive transformer. The power converter 74 is configured as a traditional flyback type converter. The power converter 74 includes an isolation transformer 94 having a primary winding P1 and a secondary winding S1. The primary winding P1 is electrically coupled to an input voltage Vin and a driving circuit including a transistor 80, a resistor 78, and a diode 82. A capacitor 84 is coupled across the input Vin and coupled with the primary winding P1. Input voltage to the circuit may be unregulated DC voltage derived from an AC supply after rectification and filtering. The driving circuit also includes a diode 96, a controller 86, and a gate drive transformer 76 having a primary winding P2 and a secondary winding S2. The diode 96 and the controller 86 are coupled in series to the secondary winding S2 on the secondary side of the circuit. The primary winding P2 of the transformer 76 is coupled to the gate of the transistor 80 via the diode 82. The transistor 80 is a fast-switching device controlled by the fast dynamic controller 86 to maintain a desired output voltage Vout. The voltage across the secondary winding S1 of the transformer 94 is rectified and filtered using the diode 92 and the capacitor 90, with the output voltage Vout delivered to the load 80 and to the controller 86. The secondary side controller 86 regulates the output voltage Vout by transmitting a driving signal to the transistor 80 via the gate drive transformer 76.

SUMMARY OF THE INVENTION

Embodiments of a switched mode power converter are directed to a feedback mechanism by which a coded train of pulses with well defined integrity is generated on a secondary side of the power converter and transmitted to a dedicated control signal winding on the primary side for decoding and application to regulate the power converter output. The control signal winding enables separation of control signal transmission and power transmission resulting in improved processing of the control signal by a primary side controller. The pulse train is modulated by a secondary side controller, transmitted across a transformer and received by the control signal winding, and supplied to the primary side controller. Such a technique allows the transmission of regulation data over an isolation galvanic barrier without using an optical coupling circuit. Coded information is included in the coded pulse train by modulating pulses of the pulse train including, but no limited to, the pulse width, the pulse amplitude, the pulse frequency, or any combination thereof.

In an aspect, a switching mode power converter is configured for forward energy transfer from a primary side to a secondary side and for reverse energy transfer from the secondary side to the primary side. The power converter includes a transformer, a first switch, a first controller, a second switch, a second controller, a first auxiliary winding and a second auxiliary winding. The Transformer has a primary winding coupled to an input supply voltage and a secondary winding. The first switch is coupled in series to the primary winding. The first controller is coupled to the switch, and the first controller is configured to turn the first switch ON and OFF. The second switch is coupled in series to the secondary winding. The second controller is coupled to the second switch, and the second controller is configured to turn the second switch ON and OFF thereby controlling a negative current through the secondary winding. The first auxiliary winding is electrically coupled to the first controller and magnetically coupled to the secondary winding to receive a power component of the reverse energy transfer for providing power to the first controller. The second auxiliary winding is electrically coupled to the first controller and magnetically coupled to the secondary winding to receive a control component of the reverse energy transfer for providing a feedback signal to regulate a circuit output characteristic.

In some embodiments, the second controller is configured to drive the second switch to generate negative current through the secondary winding to form a coded control signal, further wherein the transformer is configured as a signal transmitter to transmit the coded control signal from the secondary side of the transformer to the primary side of the transformer, wherein the first controller is configured to decode the coded control signal to identify the control information, generate a driving signal according to the control information, and drive the first switch using the driving signal to regulate an output characteristic. In some embodiments, the coded control signal is a pulse train signal having a modulated plurality of voltage pulses. The modulated plurality of pulses can be modulated by modulating one or more of a pulse amplitude, a pulse frequency, a pulse width, a pulse delay, and a number of pulse cycles. The second controller is configured to transmit the coded control signal during an OFF period of the first switch. The output characteristic can be one or more of an output voltage, an output current, and an output power of the power converter. The power converter can also include a sensing circuit coupled to the secondary winding and the second controller, wherein the sensing circuit is configured to sense the output characteristic of the power converter. In some embodiments, the first auxiliary winding has a same polarity as the secondary winding, and the second auxiliary winding has an opposite polarity of the secondary winding. In some embodiments, the forward energy transfer from the primary side of the transformer to the secondary side of the transformer does not induce current in the second auxiliary winding. In some embodiments, first switch is a first transistor and the second switch is a second transistor. The power converter can also include a diode coupled in parallel to the second switch and an output capacitor coupled in series to the diode, wherein the diode is configured to enable current flow from the secondary winding to the output capacitor when forward-biased. In this configuration, when the second switch is ON, an alternative current path through the second switch is formed between the output capacitor and the secondary winding of the transformer, further wherein a negative secondary current flows from the output capacitor to the secondary winding via the alternative current path. In some embodiments, the second auxiliary winding is configured to provide a sampling signal used for control by the first controller, the sampling signal is provided when the first switch is ON and OFF.

In another aspect, a method of controlling a switching mode power converter is disclosed. The method includes configuring a switching mode power converter. The power converter includes a transformer, a first switch, a first controller, a second switch, a second controller, a first auxiliary winding and a second auxiliary winding. The transformer has a primary winding coupled to an input supply voltage and a secondary winding. The first switch is coupled in series to the primary winding. The first controller is coupled to the switch. The second switch is coupled in series to the secondary winding. The second controller is coupled to the second switch. The first auxiliary winding is electrically coupled to the first controller and magnetically coupled to the secondary winding. The second auxiliary winding is electrically coupled to the first controller and magnetically coupled to the secondary winding. The first auxiliary winding is dedicated to receive a power transmission for powering the first controller. The second auxiliary winding is dedicated to receive a coded control signal for controlling the first switch. The method also includes driving the second switch by the second controller to generate the coded control signal, and transmitting the coded control signal from the secondary winding to the second auxiliary winding. The method also includes decoding the coded control signal by the first controller to identify control information, and driving the first switch using a driving signal generated according to the control information.

In some embodiments, the first auxiliary winding has a same polarity as the secondary winding, and the second auxiliary winding has an opposite polarity as the secondary winding. In some embodiments, a forward energy transfer from the primary side of the transformer to the secondary side of the transformer does not induce current in the second auxiliary winding. In some embodiments, driving the second switch generates negative current through the secondary winding to form the coded control signal. In some embodiments, the coded control signal comprises a pulse train signal having a modulated plurality of voltage pulses. The modulated plurality of pulses can be modulated by modulating one or more of a pulse amplitude, a pulse frequency, a pulse width, a pulse delay, and a number of pulse cycles. The coded control signal is transmitted during an OFF period of the first switch. The method can also include measuring an output characteristic of the secondary side of the transformer and the coded control signal is generated according to the output characteristic. The output characteristic can be one or more of an output voltage, an output current, and an output power of the power converter. In some embodiments, generating the coded control signal includes generating and applying a driving signal to the second switch to turn the second switch ON and OFF according to a determined pattern resulting in a modulated plurality of voltage pulses across the secondary winding of the transformer. In some embodiments, turning the second switch ON enables a negative secondary current through the secondary winding. In some embodiments, enabling the negative secondary current includes enabling an alternative current path from an output capacitor in the output circuit to the secondary winding. In some embodiments, the second auxiliary winding provides a sampling signal used for control by the first controller, the sampling signal is provided when the first switch is ON and OFF.

BRIEF DESCRIPTION OF THE DRAWINGS

Several example embodiments are described with reference to the drawings, wherein like components are provided with like reference numerals. The example embodiments are intended to illustrate, but not to limit, the invention. The drawings include the following figures.

DETAILED DESCRIPTION OF THE EMBODIMENTS

Embodiments of the present application are directed to a power converter. Those of ordinary skill in the art will realize that the following detailed description of the power converter is illustrative only and is not intended to be in any way limiting. Other embodiments of the power converter will readily suggest themselves to such skilled persons having the benefit of this disclosure.

Reference will now be made in detail to implementations of the power converter as illustrated in the accompanying drawings. The same reference indicators will be used throughout the drawings and the following detailed description to refer to the same or like parts. In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 4:
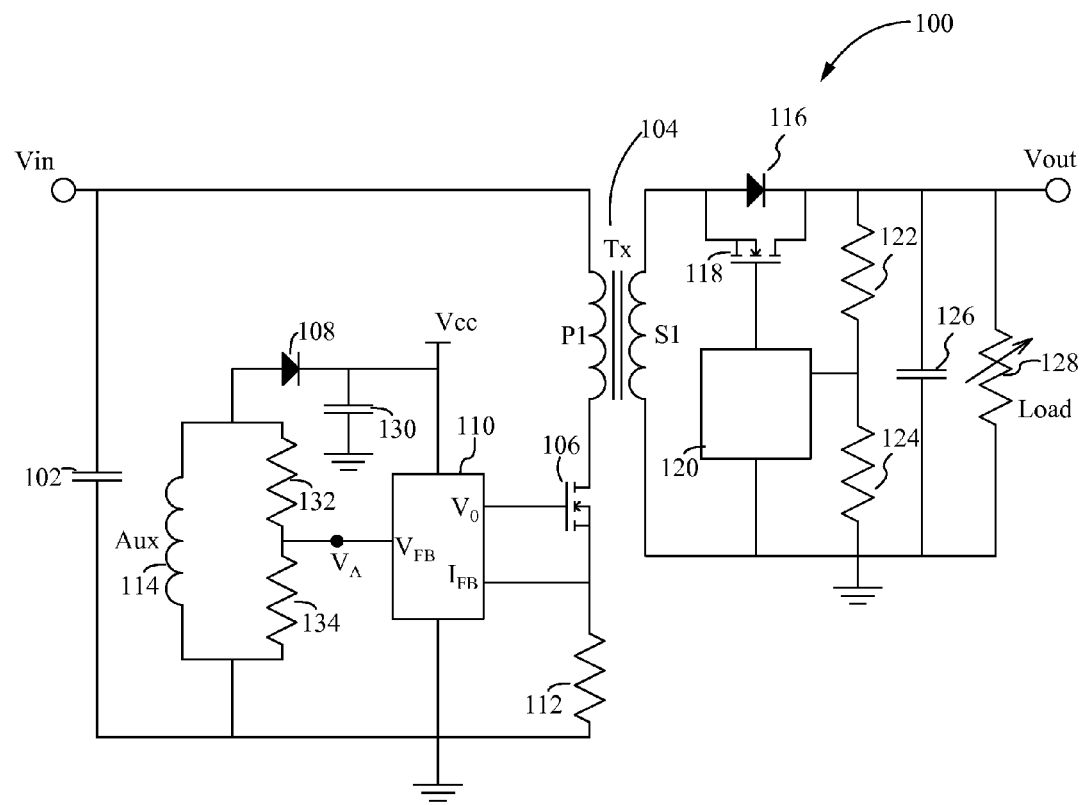
FIG. 4 illustrates a power converter according to an embodiment.

FIG. 4 illustrates a power converter according to an embodiment. The power converter 100 is configured to receive an unregulated DC voltage signal at an input node Vin and to provide a regulated output voltage Vout. Input voltage to the circuit may be unregulated DC voltage derived from an AC supply after rectification. The input voltage is typically filtered, such as via capacitor 102.

The power converter 100 is configured as a flyback converter. It is understood that the concepts described herein can be applied to alternatively configured switched mode converters including, but not limed to, a forward converter, a push-pull converter, a half-bridge converter, and a full-bridge converter. The power converter 100 includes an isolation transformer 104 having a primary winding P1 and a secondary winding S1. The primary winding P1 is electrically coupled to the input voltage Vin and a driving circuit including a switch 106, a sense resistor 112, and a controller 110. The switch 106 is coupled in series with the primary winding P1 of the transformer 104 and the sense resistor 112. The controller 110 is coupled to the switch 106 to turn the switch ON and OFF.

The power converter 100 further includes output circuitry coupled to the secondary winding 51 of the transformer 104. The output circuitry includes a freewheeling rectifier diode 116, a switch 118, a controller 120, and an output capacitor 126. The switch 118 is coupled in parallel to the diode 116. An anode of the diode 116 is coupled to a first terminal of the secondary winding. A cathode of the diode 116 is coupled to a first terminal of the output capacitor 126 and coupled to the output node Vout. The output capacitor 126 is coupled to the Vout node across an output load, represented by a resistor 128. The controller 120 is coupled to the switch 118 to turn the switch ON and OFF. The output circuitry also includes a sensing circuit configured to measure a circuit characteristic to be regulated such as an output voltage, an output current, and/or an output power. In this exemplary configuration and succeeding description, the power circuit is described as sensing and regulating the output voltage Vout. In the exemplary configuration of FIG. 4, the sensing circuit includes a resistive voltage divider including the resistors 122 and 124 coupled in parallel to the capacitor 126 to measure a voltage across the capacitor 126. It is understood that an alternative sensing circuit can be used to measure the output voltage Vout. In general, the sensing circuit can be configured to use any conventional technique for determining the value of the regulated circuit characteristic.

The switch 106 and the switch 118 are each a suitable switching device. In an exemplary embodiment, the switch 106 and the auxiliary switch 118 are each a n-type metal-oxide-semiconductor field-effect transistor (MOSFET) device. Alternatively, any other semiconductor switching device known to a person of skill in the art can be substituted for the switch 106 and/or the switch 118. Subsequent description is based on an n-channel MOSFET.

The power converter 100 has a feedback loop that includes a magnetically coupled feedback circuit coupled to the secondary winding 51 of the transformer 104. The magnetically coupled feedback circuit includes a diode 108, a capacitor 130, resistors 132 and 134 and an auxiliary winding 114. The auxiliary winding 114 is coupled in parallel to the series of resistors 132 and 134. The auxiliary winding 114 is also magnetically coupled to the secondary winding S1. When the current through the diode 116 is zero, the voltage across the secondary winding 51 is equal to the voltage across the auxiliary winding 114 if the turns ratio is 1:1, or otherwise proportional depending on the turns ratio. This relationship provides means for communicating the voltage across the secondary winding 51 as feedback to the primary side of the circuit. The value of the voltage across the secondary winding 51 is a function of the secondary current through the secondary winding 51. With the current through the diode 116 equal to zero, the transistor 118 is selectively turned ON and OFF by the controller 120. When the transistor 118 is ON, an alternative current path is formed from the charged capacitor 126 to the secondary winding 51. The alternative current path enables negative current flow through the secondary winding

51. In this manner, the controller 120 generates a driving signal that selectively turns the transistor 118 ON and OFF, thereby generating a coded train of voltage pulses across the secondary winding 51. The driving signal is configured such that the voltage pulses are modulated with coded information. In this manner, a coded voltage pulse train is transmitted during a delay period that corresponds to the switch 106 OFF and the positive secondary current through the diode 116 having dropped to zero.

In some embodiments, the coded information is the measured output circuit characteristic that is to be regulated, such as the output voltage Vout. In this case, the controller 120 receives the sensed output voltage Vout, and generates a driving signal resulting in a modulated train of voltage pulses across the secondary winding 51 that is coded to convey the sensed output voltage Vout. In this manner, a coded signal is generated in the form of a coded voltage pulse train, where the DC level of the measured output voltage Vout is coded into the coded signal. Coded information is included in the coded pulse train by modulating pulses of the pulse train including, but no limited to, the pulse width, the pulse amplitude, the pulse frequency, or any combination thereof. For example, the pulse train can be modulated by the number of pulses over a predetermined time period, or the number of pulses with different amplitudes over the time period.

The auxiliary winding 114 is magnetically coupled to the secondary winding S1, and the voltage across the auxiliary winding 114 is equal to or proportional to the voltage across the secondary winding S1 when the current through the diode 116 is zero. As such, the coded voltage pulse train is transmitted from across the isolation galvanic barrier via the magnetically coupled auxiliary winding 114 and secondary winding S1.

Figure 1:
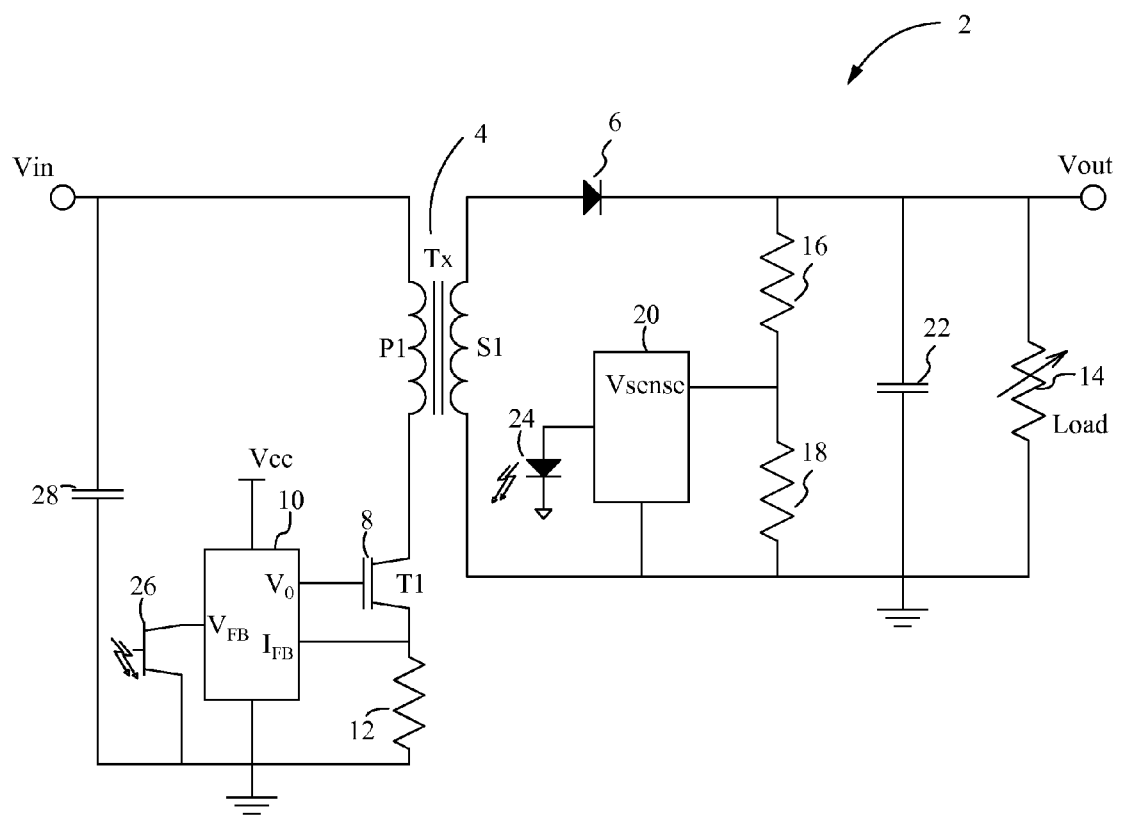
FIG. 1 illustrates a conventional regulated switch mode power converter including an optical coupler circuit.
Figure 2:
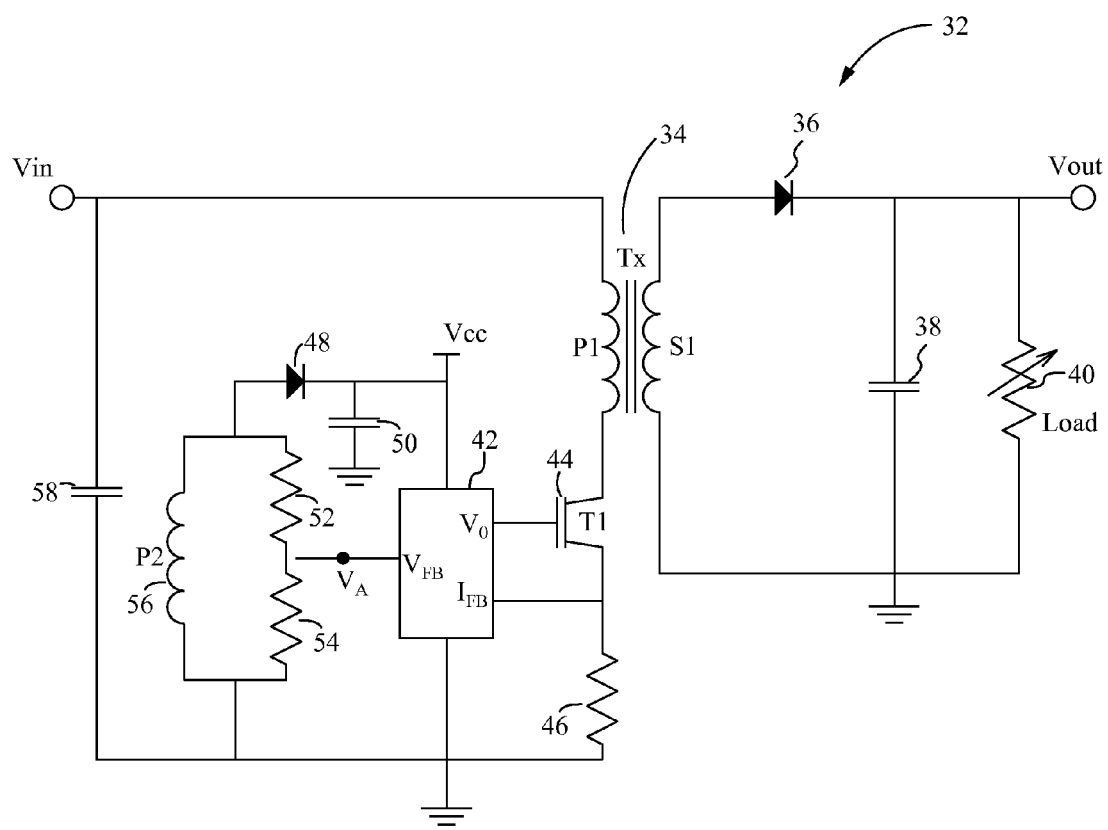
FIG. 2 illustrates a conventional regulated power converter including a magnetically coupled feedback circuit.
Figure 3:
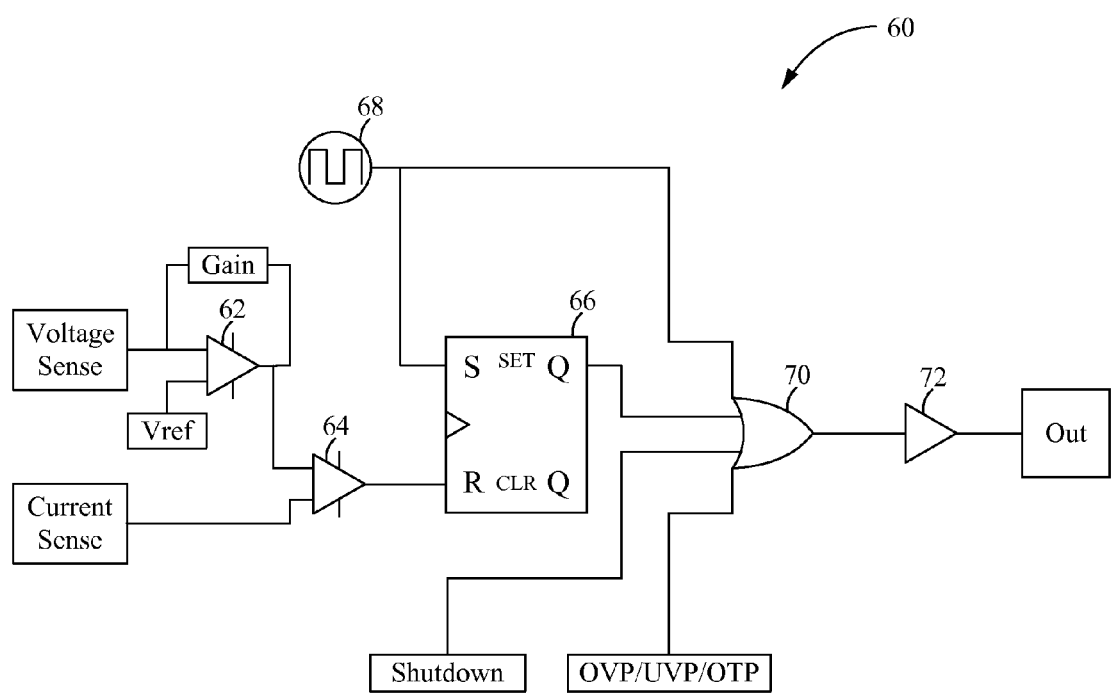
FIG. 3 illustrates a functional block diagram of a conventional real-time waveform analyzer.

The coded voltage pulse train across the auxiliary winding 114 is measured when the transistor 106 is OFF and the current through the diode 116 equals zero. The voltage VA is proportional to the voltage across the auxiliary winding 114 and therefore represents the coded voltage pulse train. The voltage VA is provided as a feedback voltage VFB to the controller 110, wherein the feedback voltage VFB represents the coded voltage pulse train. In contrast to the conventional power converter of FIG. 2 where the feedback voltage VFB is a single pulse per switching cycle of the main transistor 44, the feedback voltage VFB input to the controller 110 is a train of pulses per switching cycle of the main transistor 106. The train of pulses includes the coded information that identifies the measured output voltage Vout, again in contrast to the conventional power converter of FIG. 2 where the single pulse represents the actual output voltage Vout.

Figure 5:
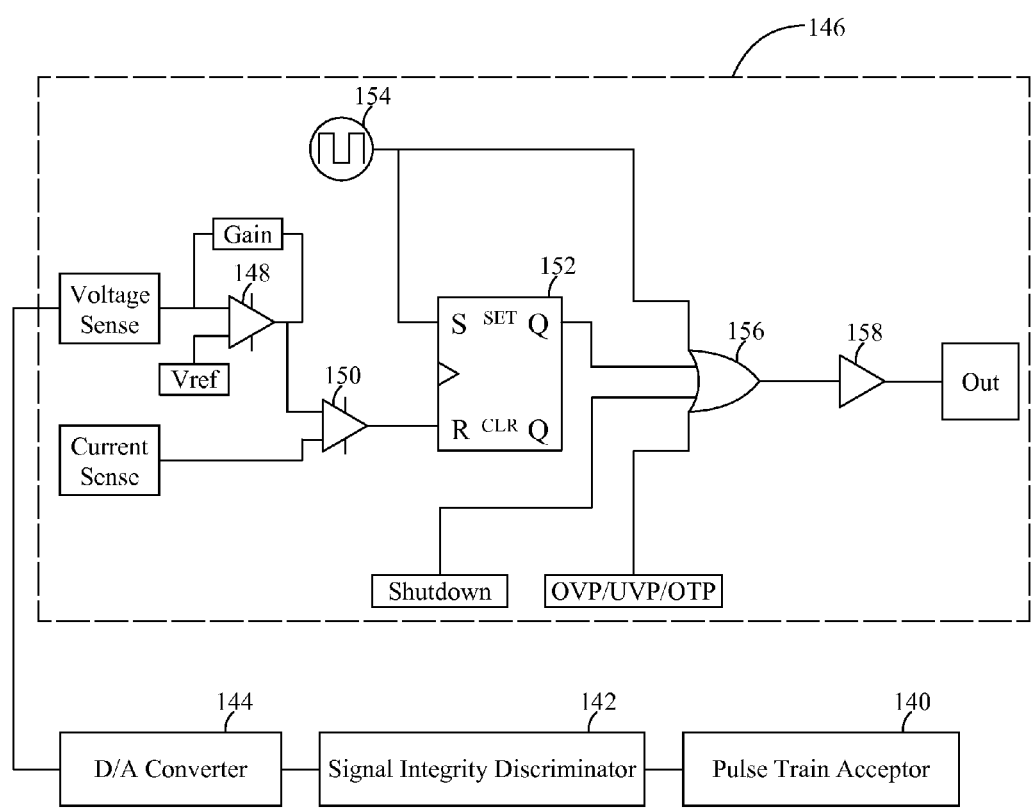
FIG. 5 illustrates a functional block diagram of a portion of the controller for processing the coded voltage pulse train according to an embodiment.

The controller 110 is configured to receive the feedback voltage FB. The current through the transistor 106 is also provided as feedback current IFB to the controller 110. The controller 110 includes a real-time waveform analyzer that analyzes input feedback signals, such as the feedback voltage VFB and the feedback current IFB. FIG. 5 illustrates a functional block diagram of a portion of the controller 110 for processing the coded voltage pulse train according to an embodiment. The feedback voltage VFB input to the controller 110 is received by a pulse train acceptor 140. The pulse train acceptor is a digital filter element, such as a high pass filter, that filters the received coded voltage pulse train. The filtered signal output from the pulse train acceptor 140 is input to a signal integrity discriminator 142 where the signal is decoded and the measured output voltage Vout coded into the coded voltage pulse train is identified. The signal integrity discriminator 142 generates and outputs a driving signal that corresponds to the identified output voltage Vout. The driving signal is input to a digital to analog converter 144 and converted to a corresponding DC level.

The DC level output from the converter 144 is input to the waveform analyzer 146 as the "voltage sense". The feedback current IFB is input to the waveform analyzer as the "current sense". The voltage sense is provided as a first input to an error amplifier 148. The current sense is provided as a first input to the error amplifier 150. Error amplifiers 148 and 150 are acceptors of the regulating means, which in this configuration are the voltage sense and the current sense. The error amplifier 148 compares the input voltage sense to a reference voltage and outputs a first difference value. The first difference value is amplified by the gain of the error amplifier 148. The error amplifier 150 compares the amplified first difference value to the current sense and outputs a second difference value that is either High or Low. A pulse width modulation (PWM) block 152 is configured as a Flip-Flop digital device. The output of the PWM block 152 is set according to the switching frequency of the clock 154 and is Reset by the High or Low value input from the error amplifier 150. The variable signal applied to the Reset pin generates an output signal that is a pulse train modulated by the pulse width. A multiple input OR gate 156 inputs the clock signal, the pulse train signal, a shutdown signal, and a OVP/UVP/OTP signal. The OR gate 156 outputs a high voltage value when one of the inputs to the OR gate is high or to output a low voltage value when all of the inputs to the OR gate are low. The output of the OR gate 156 is amplified by amplifier 158 and output to drive the gate of the transistor 106 (FIG. 4). The high voltage value output from the OR gate 156 corresponds to turning ON the transistor 106 in FIG. 4. The low voltage value output from the OR gate 156 corresponds to turning OFF the transistor 106. The OR gate 156 also enables a high voltage value to propagate to the output by monitoring abnormal conditions such as under voltage, over voltage, over temperature, etc. In this manner, the pulse width of each pulse output from the PWM block 152 can be modified to adjust the output voltage into regulation.

In general, control intricacies of the waveform analyzer are aligned with control argument sampling to achieve overall system functional performance. Sampling argument is in the form of current, voltage and impedance. System functional performance is in the form of pulse width modulation (PWM), pulse frequency modulation (PFM) and pulse amplitude modulation (PAM). The waveform analyzer shown in FIG. 5 is an exemplary implementation. It is understood that alternative circuits and methodologies can be used to process the DC level output from the converter 144 and to output a signal for appropriately driving the transistor 106. It is also understood that the controller 110 can be alternatively configured to process the coded voltage pulse train and to generate a driving signal for controlling the transistor 106.

In operation, a circuit output characteristic is measured on the secondary side of a switching mode power converter. In an exemplary application, the circuit output characteristic is the output voltage Vout. The secondary side controller generates a driving signal for controlling the secondary side transistor while the primary side main transistor is OFF. The driving signal selectively turns ON and OFF the secondary side transistor resulting in a coded train of voltage pulses across the secondary winding. The measured output voltage Vout is coded into the coded voltage pulse train. In some embodiments, the coded voltage pulse train is transmitted from the secondary winding to the auxiliary winding by magnetic coupling between the two windings. In other embodiments, the coded voltage pulse train is transmitted form the secondary winding to the auxiliary winding using the parasitic capacitance of either the transformer or the inherent capacitance of the printed circuit board across the isolation galvanic barrier, where the printed circuit board capacitance is due to the formation of the transformer and corresponding circuitry layout of the power converter components. The coded voltage pulse train is received and decoded by the primary side controller. The primary side controller identifies the measured output voltage Vout according to the decoded information and generates a driving signal corresponding to the identified output voltage Vout. In some embodiments, the driving signal is converted to a DC level that is input as the voltage sense to a waveform analyzer. The waveform analyzer uses the input voltage sense to generate a driving signal for controlling the primary side main transistor and regulating the output voltage Vout.

Although the coded information within the coded voltage pulse train is described above as including information that identifies the output voltage Vout, the coded voltage pulse train can be alternatively modulated to include additional or alternative information. Such information includes, but is not limited to, a simple instruction to turn ON or OFF the primary side main transistor, an indicator of a short circuit condition, or an indicator of a voltage out of regulation. Each type of information is represented by a separate coding.

In an alternative configuration, a bi-directional switch is used in place of the diode 116 and the transistor 118. A body diode of the bi-directional switch functions as the freewheeling diode 116. Control of the bi-directional switch is the same as the transistor 118 to enable a negative secondary current Isec.

In the power converter circuit configuration of FIG. 4, energy is transferred in two directions, a first direction from the primary side to the secondary side and a second direction from the secondary side to the primary side. The first direction is a forward energy transfer that provides power from the input supply to the output load. The second direction is a reverse energy transfer that provides both a power component whereby energy is stored in the capacitor 130 and a control signaling component sensed by the primary side controller 110. Energy stored in the capacitor 130, supplied by the power component of the reverse energy transfer, along with the power supplied by Vcc, powers the controller 110. The magnetically coupled auxiliary winding 114 enables the reverse energy transfer and the controller 110 discriminates the control signaling from the power for operating the controller 110.

Figure 6:
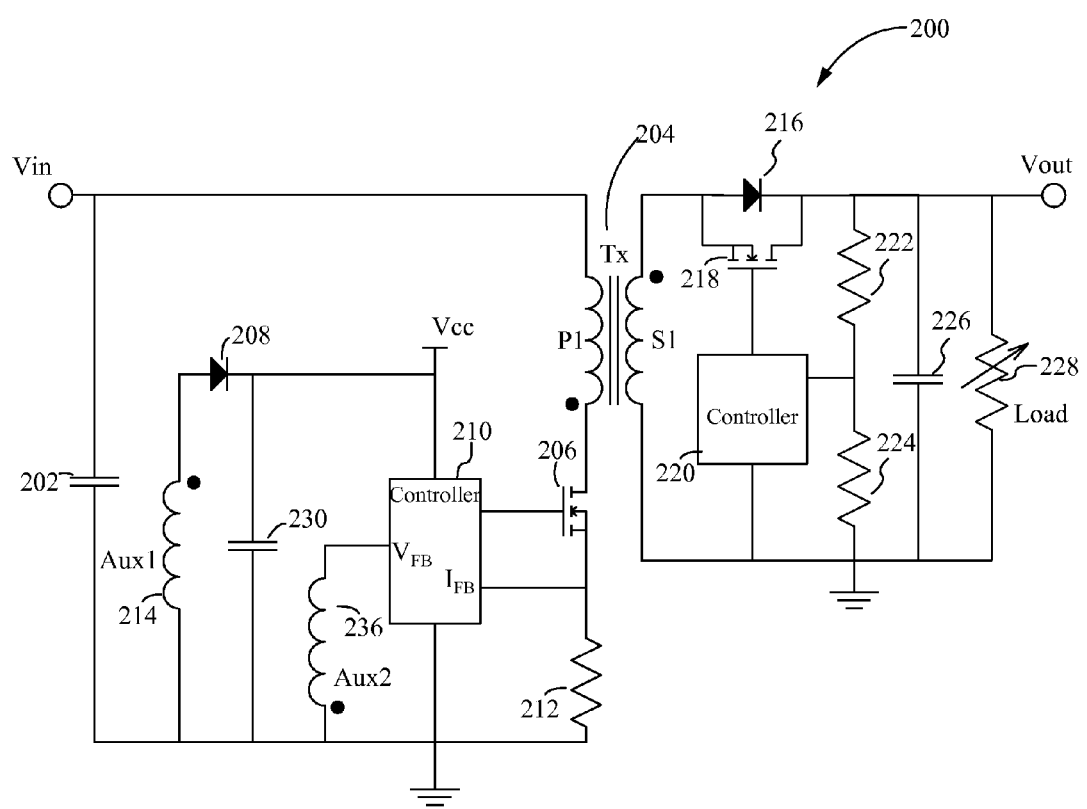
FIG. 6 illustrates a power converter according to another embodiment.

In an alternative configuration to the power converter circuit of FIG. 4, a second auxiliary winding is added to the primary side circuitry so as to separate the control signaling from the power delivery in the reverse energy transfer direction. FIG. 6 illustrates a power converter according to another embodiment. The power converter 200 is configured to receive an unregulated DC voltage signal at an input node Vin and to provide a regulated output voltage Vout. Input voltage to the circuit may be unregulated DC voltage derived from an AC supply after rectification. The input voltage is typically filtered, such as via capacitor 202.

The power converter 200 is configured as a flyback converter. It is understood that the concepts described herein can be applied to alternatively configured switched mode converters including, but not limed to, a forward converter, a push-pull converter, a half-bridge converter, and a full-bridge converter. The power converter 200 includes an isolation transformer 204 having a primary winding P1 and a secondary winding S1. The primary winding P1 is electrically coupled to the input voltage Vin and a driving circuit including a switch 206, a sense resistor 212, and a controller 210. The switch 206 is coupled in series with the primary winding P1 of the transformer 204 and the sense resistor 212. The controller 210 is coupled to the switch 206 to turn the switch ON and OFF.

The power converter 200 further includes output circuitry coupled to the secondary winding S1 of the transformer 204. The output circuitry includes a freewheeling rectifier diode 216, a switch 218, a controller 220, and an output capacitor 226. The switch 218 is coupled in parallel to the diode 216. An anode of the diode 216 is coupled to a first terminal of the secondary winding S1. A cathode of the diode 216 is coupled to a first terminal of the output capacitor 226 and coupled to the output node Vout. The output capacitor 226 is coupled to the Vout node across an output load, represented by a resistor 228. The controller 220 is coupled to the switch 218 to turn the switch ON and OFF. The output circuitry also includes a sensing circuit configured to measure a circuit characteristic to be regulated such as an output voltage, an output current, and/or an output power. In this exemplary configuration and succeeding description, the power circuit is described as sensing and regulating the output voltage Vout. In the exemplary configuration of FIG. 6, the sensing circuit includes a resistive voltage divider including the resistors 222 and 224 coupled in parallel to the capacitor 226 to measure a voltage across the capacitor 226. It is understood that an alternative sensing circuit can be used to measure the output voltage Vout. In general, the sensing circuit can be configured to use any conventional technique for determining the value of the regulated circuit characteristic, such as a voltage, current or power.

The switch 206 and the switch 218 are each a suitable switching device. In an exemplary embodiment, the switch 206 and the auxiliary switch 218 are each a n-type metal-oxide-semiconductor field-effect transistor (MOSFET) device. Alternatively, any other semiconductor switching device known to a person of skill in the art can be substituted for the switch 206 and/or the switch 218. Subsequent description is based on an n-channel MOSFET.

The power converter 200 has two separate auxiliary windings, a first auxiliary winding 214 and a second auxiliary winding 236, in the primary side circuit to enable two paths for transferring energy from the secondary side to the primary side, referred to as the reverse energy transfer in the second direction. These two separate paths effectively separate the power transfer functionality from the control signaling functionality included in the reverse energy transfer. The first auxiliary winding 214 is part of a power delivery circuit that includes a diode 208 and a capacitor 230. The power delivery circuit is coupled to provide power to the controller 210. The auxiliary winding 214 is magnetically coupled to the secondary winding 51 and forms a first reverse energy transfer path that enables power transfer from the secondary side to the controller 210.

The auxiliary winding 236 is part of a feedback loop for providing control signaling from the secondary side to the controller 210. The auxiliary winding 236 is magnetically coupled to the secondary winding 51. The functionality of the feedback loop in FIG. 6 is similar in operation to the feedback loop in FIG. 4. When the current through the diode 216 is zero, the voltage across the secondary winding 51 is equal to the voltage across the auxiliary winding 236 if the turns ratio is 1:1, or otherwise proportional depending on the turns ratio. This relationship provides means for communicating the voltage across the secondary winding 51 as feedback to the primary side of the circuit. The value of the voltage across the secondary winding 51 is a function of the secondary current through the secondary winding 51. With the transistor 206

OFF and the current through the diode 216 equal to zero, the transistor 218 is selectively turned ON and OFF by the controller 220. When the transistor 218 is ON, an alternative current path is formed from the charged capacitor 226 to the secondary winding 51. The alternative current path enables negative current flow through the secondary winding 51. In this manner, the controller 220 generates a driving signal that selectively turns the transistor 218 ON and OFF, thereby generating a coded train of voltage pulses across the secondary winding S1. The driving signal is configured such that the voltage pulses are modulated with coded information. In this manner, a coded voltage pulse train is transmitted during a delay period that corresponds to the transistor 206 OFF and the positive secondary current through the diode 216 having dropped to zero.

In some embodiments, the coded information is the measured output circuit characteristic that is to be regulated, such as the output voltage Vout. In this case, the controller 220 receives the sensed output voltage Vout, and generates a driving signal resulting in a modulated train of voltage pulses across the secondary winding S1 that is coded to convey the sensed output voltage Vout. In this manner, a coded signal is generated in the form of a coded voltage pulse train, where the DC level of the measured output voltage Vout is coded into the coded signal. Coded information is included in the coded pulse train by modulating pulses of the pulse train including, but no limited to, the pulse width, the pulse amplitude, the pulse frequency, or any combination thereof. For example, the pulse train can be modulated by the number of pulses over a predetermined time period, or the number of pulses with different amplitudes over the time period.

The auxiliary winding 236 is magnetically coupled to the secondary winding S1, and the voltage across the auxiliary winding 236 is equal to or proportional to the voltage across the secondary winding S1 when the current through the diode 216 is zero. As such, the coded voltage pulse train is transmitted from across the isolation galvanic barrier via the magnetically coupled auxiliary winding 236 and secondary winding S1.

The coded voltage pulse train across the auxiliary winding 236 is measured when the transistor 206 is OFF and the current through the diode 216 equals zero. The voltage across the auxiliary winding 236 is provided as a feedback voltage VFB to the controller 210, wherein the feedback voltage VFB represents the coded voltage pulse train. The feedback voltage VFB input to the controller 210 is a train of pulses per switching cycle of the main transistor 206. The train of pulses includes the coded information that identifies the measured output voltage Vout, or other output circuit characteristic or abnormality such as over voltage, under voltage, or over temperature.

The controller 210 is configured to receive the feedback voltage VFB. The current through the transistor 206 is also provided as feedback current IFB to the controller 210. In general, the controller 210 discriminates between regulating voltage or current based on the pulse amplitudes, pulse widths, and/or frequencies of the pulses in the pulse train signal. In some embodiments, the controller 210 includes a pulse train acceptor, a signal integrity discriminator, an digital to analog converter, and a real-time waveform analyzer including a pulse width modulation (PWM) block. In some embodiments, the pulse train acceptor, the signal integrity discriminator, the digital to analog converter, and the real-time waveform analyzer perform similar functionality as the pulse train acceptor 140, the signal integrity discriminator 142, the digital to analog converter 144, and the real-time waveform analyzer 146, respectively, in FIG. 5. In some embodiments, the feedback voltage VFB input to the controller 210 is received by the pulse train acceptor. The pulse train acceptor is a digital filter element, such as a high pass filter, that filters the received coded voltage pulse train. The filtered signal output from the pulse train acceptor is input to a signal integrity discriminator where the signal is decoded and the measured output voltage Vout coded into the coded voltage pulse train is identified. The signal integrity discriminator generates and outputs a driving signal that corresponds to the identified output voltage Vout. The driving signal is input to the digital to analog converter and converted to a corresponding DC level.

The DC level output from the converter is input to the waveform analyzer. The feedback current IFB is also input to the waveform analyzer. The waveform analyzer processes the input feedback signals, such as the feedback voltage VFB and the feedback current IFB, to generate a driving signal for the transistor 206.

In operation, the power converter 200 functions similarly as the power converter 100 except that the control signaling transmitted from the secondary side is received on the primary side by a winding dedicated to receive the control signaling, in this case the second auxiliary winding 236. The first auxiliary winding 214 is dedicated for power delivery. As such, the signal discrimination performed by the controller 210 does not need to separate the control signaling from the power transmission, as does the controller 110 in the power converter 100. The auxiliary winding 236 is independent of the primary winding S1 and the auxiliary winding 214, and is recognized only by control signal discriminating circuitry within the controller 210. In some embodiments, the auxiliary winding 236 is dedicated to receive the control signaling while the auxiliary winding 214 is isolated from receiving the control signaling by configuring the two auxiliary windings with opposite polarities.

The polarities of the primary winding P1, the secondary winding S1, the first auxiliary winding 214, and the second auxiliary winding 236 are configured such that during forward energy transfer where energy is delivered from the primary side to the secondary side, the primary winding P1, the secondary winding S1, and the first auxiliary winding 214 are in-phase, but the second auxiliary winding 236 is out-of-phase such that there is zero voltage across the second auxiliary winding 236 during forward energy transmission.

During reverse energy transfer where energy is delivered from the secondary side to the primary side, the secondary winding S1 and the second auxiliary winding 236 are in-phase and the first auxiliary winding 214 is out-of-phase such that the voltage across the first auxiliary winding 214 is sufficient to put the diode 208 in the conduction mode, thereby charging the capacitor 230. When the control signal is transmitted by the controller 220, such as the pulse train signal transmitted during the delay period while the transistor 206 is OFF, the resulting voltage appears across the second auxiliary winding 236. In this manner, the control signal is transmitted to the auxiliary winding 236 and not transmitted to the primary winding P1 because the transistor 206 is OFF during reverse energy transfer. Since the auxiliary winding 236 is a dedicated winding isolated from the diode 208 and the capacitor 230, the control signal supplied as voltage across the auxiliary winding 236 is no longer subject to distortions caused by the diode 208 and the capacitor 230.

Additionally, configuring the auxiliary winding 236 with a different polarity than the auxiliary winding 214 enables the controller 210 to sense a positive voltage when the transistor 206 is ON. This provides additional flexibility for monitoring and thereby controlling circuit conditions when the transistor 206 is ON. When the transistor 206 is OFF, the controller controls the feedback condition through monitoring the sensed voltage across the auxiliary winding 236, which point corresponds to the output voltage Vout during the delay period. When the transistor 206 is ON, the controller 210 controls another set of conditions. For example, when the transistor 206 is ON, the voltage across the auxiliary winding 236 is proportional to the input voltage Vin. In this manner, configuring the auxiliary windings 214 and 236 with different polarities provides a wider range of control for the controller than the single auxiliary winding configuration as in FIG. 4. The auxiliary winding 236 provides a sampling signal for full cycle control when the transistor 206 either ON or OFF.

Figure 7:
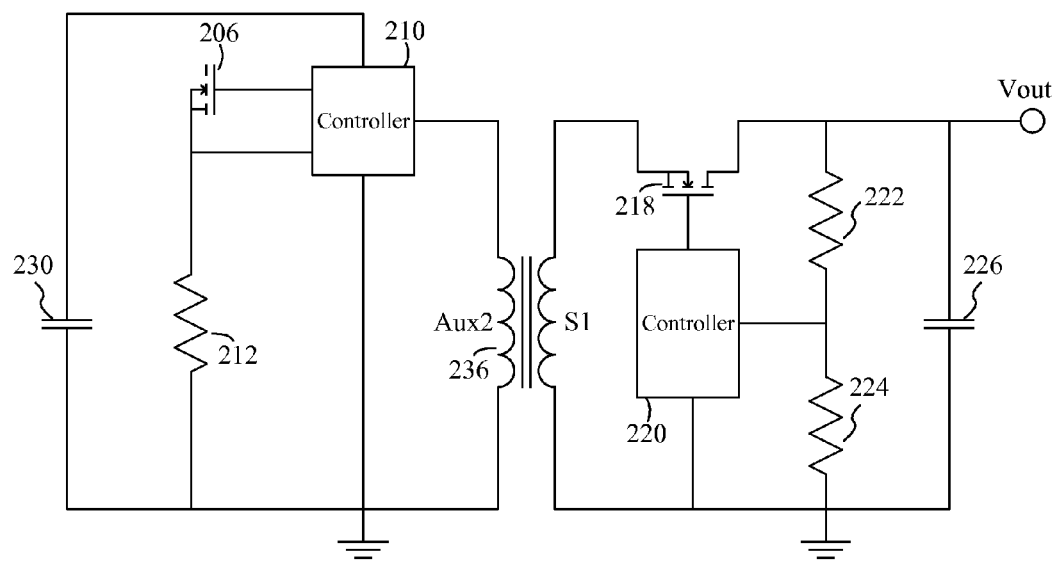
FIG. 7 illustrates the equivalent circuit for the power converter of FIG. 6 during reverse energy transfer.
Figure 8:
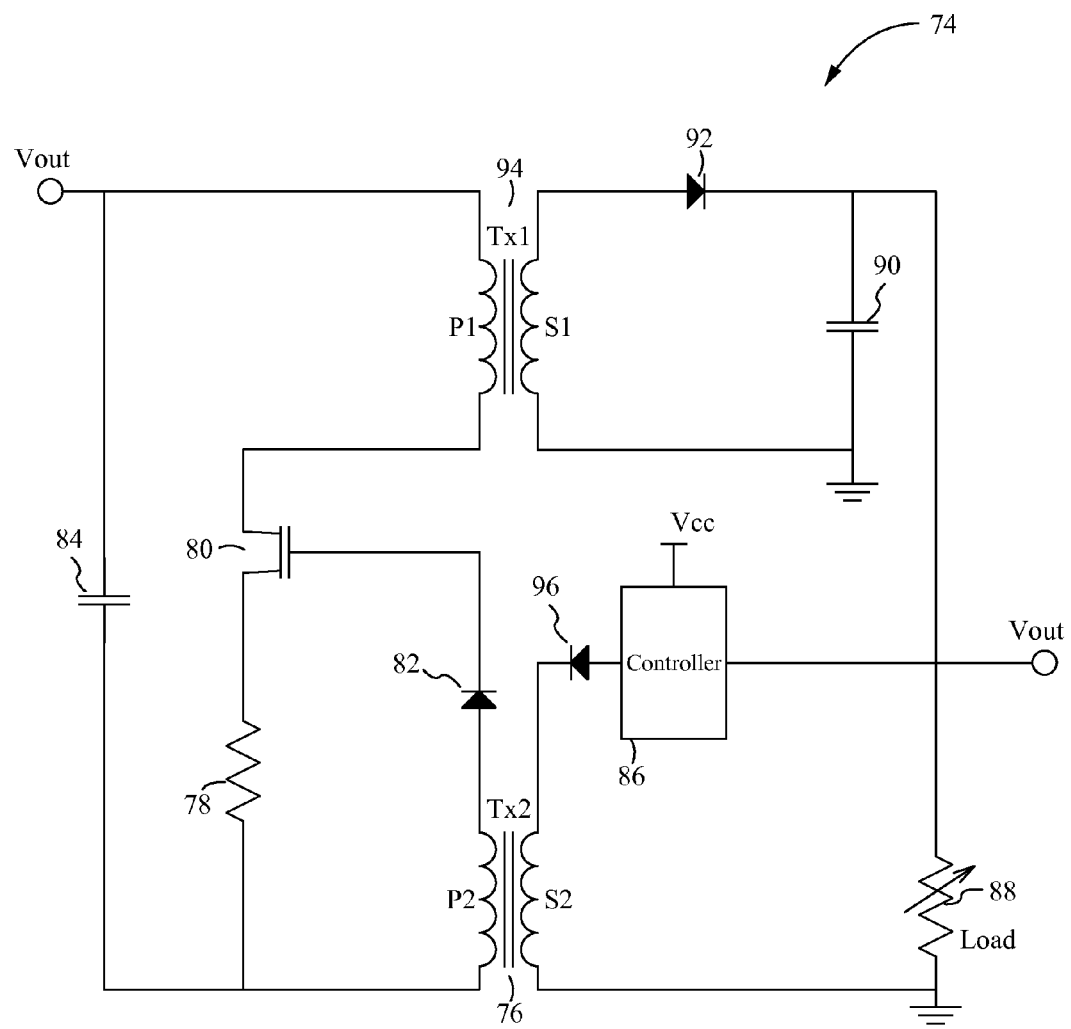
FIG. 8 illustrates a conventional regulated power converter including a second transformer used as a gate drive transformer.

FIG. 7 illustrates the equivalent circuit for the power converter 200 during reverse energy transfer. In this case, the transistor 206 is OFF and therefore no current flows through primary winding P1. During reverse energy transfer from the primary side to the secondary side, the first auxiliary winding 214 has an opposite polarity as the secondary winding S1. With the controller 220 driving the transistor 218, the control signal is transmitted as the reverse energy transfer from the secondary winding S1 to the second auxiliary winding 236. In this manner, the second auxiliary winding 236 functions as a dedicated control winding for receiving the control signal transmitted from the secondary side.

In some embodiments, the transformer 204 has a single core with four windings, the primary winding S1, the secondary winding P1, the first auxiliary winding 214, and the second auxiliary winding 236. It is understood that alternative configurations are contemplated whereby a winding on the primary side is dedicated as a control signal winding.

The present application has been described in terms of specific embodiments incorporating details to facilitate the understanding of the principles of construction and operation of the power converter. Many of the components shown and described in the various figures can be interchanged to achieve the results necessary, and this description should be read to encompass such interchange as well. As such, references herein to specific embodiments and details thereof are not intended to limit the scope of the claims appended hereto. It will be apparent to those skilled in the art that modifications can be made to the embodiments chosen for illustration without departing from the spirit and scope of the application.

What is claimed is:

1. A switching mode power converter configured for forward energy transfer from a primary side to a secondary side and for reverse energy transfer from the secondary side to the primary side, the power converter comprising:
    a) a transformer having a primary winding coupled to an input supply voltage and a secondary winding;
    b) a first switch coupled in series to the primary winding;
    c) a first controller coupled to the switch, wherein the first controller is configured to turn the first switch ON and OFF;
    d) a second switch coupled in series to the secondary winding;
    e) a second controller coupled to the second switch, wherein the second controller is configured to turn the second switch ON and OFF thereby controlling a negative current through the secondary winding;
    f) a first auxiliary winding electrically coupled to the first controller and magnetically coupled to the secondary winding to receive a power component of the reverse energy transfer for providing power to the first controller; and
    g) a second auxiliary winding electrically coupled to the first controller and magnetically coupled to the secondary winding to receive a control component of the reverse energy transfer for providing a feedback signal to regulate a circuit output characteristic.

2. The power converter of claim 1 wherein the second controller is configured to drive the second switch to generate negative current through the secondary winding to form a coded control signal, further wherein the transformer is configured as a signal transmitter to transmit the coded control signal from the secondary side of the transformer to the primary side of the transformer, wherein the first controller is configured to decode the coded control signal to identify the control information, generate a driving signal according to the control information, and drive the first switch using the driving signal to regulate an output characteristic.

3. The power converter of claim 2 wherein the coded control signal comprises a pulse train signal having a modulated plurality of voltage pulses.

4. The power converter of claim 3 wherein the modulated plurality of pulses is modulated by modulating one or more of a pulse amplitude, a pulse frequency, a pulse width, a pulse delay, and a number of pulse cycles.

5. The power converter of claim 2 wherein the second controller is configured to transmit the coded control signal during an OFF period of the first switch.

6. The power converter of claim 2 wherein the output characteristic is one or more of an output voltage, an output current, and an output power of the power converter.

7. The power converter of claim 1 wherein the coded control signal is based on a sensed output characteristic.

8. The power converter of claim 1 further comprising a sensing circuit coupled to the secondary winding and the second controller, wherein the sensing circuit is configured to sense the output characteristic of the power converter.

9. The power converter of claim 1 wherein the first auxiliary winding has a same polarity as the secondary winding, and the second auxiliary winding has an opposite polarity of the secondary winding.

10. The power converter of claim 5 wherein the forward energy transfer from the primary side of the transformer to the secondary side of the transformer does not induce current in the second auxiliary winding.

11. The power converter of claim 1 wherein the first switch comprises a first transistor and the second switch comprises a second transistor.

12. The power converter of claim 1 further comprising a diode coupled in parallel to the second switch and an output capacitor coupled in series to the diode, wherein the diode is configured to enable current flow from the secondary winding to the output capacitor when forward-biased.

13. The power converter of claim 12 wherein when the second switch is ON, an alternative current path through the second switch is formed between the output capacitor and the secondary winding of the transformer, further wherein a negative secondary current flows from the output capacitor to the secondary winding via the alternative current path.

14. The power converter of claim 1 wherein the second auxiliary winding is configured to provide a sampling signal used for control by the first controller, the sampling signal is provided when the first switch is ON and OFF.

15. A method of controlling a switching mode power converter comprising:
    a) configuring a switching mode power converter comprising a transformer having a primary winding coupled to an input supply voltage and a secondary winding, a first switch coupled in series to the primary winding, a first controller coupled to the switch, a second switch coupled in series to the secondary winding, a second controller coupled to the second switch, a first auxiliary winding electrically coupled to the first controller and magnetically coupled to the secondary winding, and a second auxiliary winding electrically coupled to the first controller and magnetically coupled to the secondary winding, wherein the first auxiliary winding is dedicated to receive a power transmission for powering the first controller and the second auxiliary winding is dedicated to receive a coded control signal for controlling the first switch;

b) driving the second switch by the second controller to generate the coded control signal;

c) transmitting the coded control signal from the secondary winding to the second auxiliary winding;

d) decoding the coded control signal by the first controller to identify control information;

e) driving the first switch using a driving signal generated according to the control information.

16. The method of claim 15 wherein the first auxiliary winding has a same polarity as the secondary winding, and the second auxiliary winding has an opposite polarity as the secondary winding.

17. The method of claim 16 wherein a forward energy transfer from the primary side of the transformer to the secondary side of the transformer does not induce current in the second auxiliary winding.

18. The method of claim 15 wherein driving the second switch generates negative current through the secondary winding to form the coded control signal.

19. The method of claim 15 wherein the coded control signal comprises a pulse train signal having a modulated plurality of voltage pulses.

20. The method of claim 19 wherein the modulated plurality of pulses is modulated by modulating one or more of a pulse amplitude, a pulse frequency, a pulse width, a pulse delay, and a number of pulse cycles.

21. The method of claim 15 wherein the coded control signal is transmitted during an OFF period of the first switch.

22. The method of claim 15 further comprising measuring an output characteristic of the secondary side of the transformer and coded control signal is generated according to the output characteristic.

23. The method of claim 22 wherein the output characteristic is one or more of an output voltage, an output current, and an output power of the power converter.

24. The method of claim 15 wherein generating the coded control signal comprises generating and applying a driving signal to the second switch to turn the second switch ON and OFF according to a determined pattern resulting in a modulated plurality of voltage pulses across the secondary winding of the transformer.

25. The method of claim 24 wherein turning the second switch ON enables a negative secondary current through the secondary winding.

26. The method of claim 25 wherein enabling the negative secondary current comprises enabling an alternative current path from an output capacitor in the output circuit to the secondary winding.

27. The method of claim 15 wherein the second auxiliary winding provides a sampling signal used for control by the first controller, the sampling signal is provided when the first switch is ON and OFF.

* * * * *

UNITED STATES PATENT AND TRADEMARK OFFICE
CERTIFICATE OF CORRECTION

PATENT NO. : 9,184,668 B2  
APPLICATION NO. : 14/024514  
DATED : November 10, 2015  
INVENTOR(S) : Mark Telefus Page 1 of 1

It is certified that error appears in the above-identified patent and that said Letters Patent is hereby corrected as shown below:

Specification

Column 8 at lines 14, 48, 55, 59, 61, 62, 66; Column 9 at lines 1, 4, and 15; Column 12 at lines 51, 57, 60, 64, 66, and 67; each occurrence of "secondary winding 51" should read --secondary winding S1--.

Signed and Sealed this
Seventeenth Day of May, 2016

Michelle K. Lee
*Director of the United States Patent and Trademark Office*